US012271801B2

(12) United States Patent
Li et al.

(10) Patent No.: US 12,271,801 B2
(45) Date of Patent: Apr. 8, 2025

(54) MEMORY NETWORK METHOD BASED ON AUTOMATIC ADDRESSING AND RECURSIVE INFORMATION INTEGRATION

(71) Applicant: Peking University Shenzhen Graduate School, Guangdong Province (CN)

(72) Inventors: Ge Li, Guangdong Province (CN); Zhangheng Li, Guangdong Province (CN); Jiaxing Zhong, Guangdong Province (CN); Jingjia Huang, Guangdong Province (CN); Tao Zhang, Guangdong Province (CN)

(73) Assignee: PEKING UNIVERSITY SHENZHEN GRADUATE SCHOOL, Guangdong Province (CN)

( * ) Notice: Subject to any disclaimer, the term of this patent is extended or adjusted under 35 U.S.C. 154(b) by 582 days.

(21) Appl. No.: 17/423,223

(22) PCT Filed: Aug. 21, 2019

(86) PCT No.: PCT/CN2019/101806
§ 371 (c)(1),
(2) Date: Jul. 15, 2021

(87) PCT Pub. No.: WO2021/007919
PCT Pub. Date: Jan. 21, 2021

(65) Prior Publication Data
US 2022/0138525 A1 May 5, 2022

(30) Foreign Application Priority Data
Jul. 15, 2019 (CN) .......................... 201910635623.9

(51) Int. Cl.
*G06N 3/04* (2023.01)
*G06F 12/06* (2006.01)

(52) U.S. Cl.
CPC ............... *G06N 3/04* (2013.01); *G06F 12/06* (2013.01); *G06F 2212/1044* (2013.01)

(58) Field of Classification Search
CPC ...................................................... G06N 3/04
(Continued)

(56) References Cited

U.S. PATENT DOCUMENTS

| 10,258,304 B1* | 4/2019 | Kiraly | ...................... A61B 5/08 |
| 2017/0150235 A1* | 5/2017 | Mei | ......................... G06N 3/044 |
| 2018/0203852 A1* | 7/2018 | Goyal | ..................... G06F 40/56 |

FOREIGN PATENT DOCUMENTS

| CN | 112840359 A | * | 5/2021 | .......... G06F 11/3037 |
| CN | 115392128 B | * | 2/2024 | ............. G06F 30/27 |
| WO | WO-2018142378 A1 | * | 8/2018 | ............. G06N 20/00 |

* cited by examiner

*Primary Examiner* — Ruay Ho
(74) *Attorney, Agent, or Firm* — CANTOR COLBURN LLP

(57) ABSTRACT

A memory network method based on automatic addressing and recursive information integration. The method is based on a memory neural network framework integrating automatic addressing and recursive information, and is an efficient and lightweight memory network method. A memory is read and written by means of an automatic addressing operation having low time and space complexity, and memory information is effectively utilized by a novel computing unit. The whole framework has the characteristics of high efficiency, high speed and high universality. The method is suitable for various time sequence processing (Continued)

tasks, and shows the performance superior to that of the conventional LSTM and the previous memory network.

5 Claims, 5 Drawing Sheets

(58) Field of Classification Search
USPC .......................................................... 706/30
See application file for complete search history.

MEMORY NETWORK METHOD BASED ON AUTOMATIC ADDRESSING AND RECURSIVE INFORMATION INTEGRATION

CROSS REFERENCE TO RELATED APPLICATIONS

This is the U.S. national stage of application No. PCT/CN2019/101806, filed on Aug. 21, 2019. Priority under 35 U.S.C. § 119 (a) and 35 U.S.C. § 365 (b) is claimed from Chinese Application No. 201910635623.9 filed Jul. 15, 2019, the disclosure of which is also incorporated herein by reference.

TECHNICAL FIELD

The present invention belongs to the field of deep learning, relates to a recurrent neural network and a memory neural network, in particular to a memory network method based on automatic addressing and recursive information integration.

BACKGROUND ART

In the deep learning technology, a recurrent neural network (RNN) is a typical neural network for processing a time sequence task. Representative frameworks of the recurrent neural network, such as a long-short term memory network (LSTM) and a gated recurrent unit (GRU), have good ability of time series modeling and are applied to time sequence tasks in various actual scenes, for example, speech recognition, text inference and video analysis.

However, at present, the typical recurrent neural networks all face the following two problems of:
1. The problems of a vanishing gradient and an exploding gradient during training. Under the condition with a relatively long time step of training, the condition that a gradient is too small (approaching 0) or too large (approaching infinity) caused by multiplying gradients easily occurs, which leads to the situation that training of a network cannot converge.
2. Limited memory ability to historical information as the RNN only transfers a hidden state with a limited dimension at last and next time steps.

Based on the two problems, by borrowing idea from a Von Neumann architecture, a related study proposes a memory enhanced recurrent neural network, that is information produced of the RNN at each time step is explicitly stored in a memory matrix, and a memory is read and written at each time step by leaning a trainable reading and writing mode. Such a memory mechanism can obviously solve the above two problems of the RNN:
1. During gradient training, a gradient may be directly propagated to some a required time step in the past through the memory, gradient multiplication is avoided, and thus the problems of the vanishing gradient and the exploding gradient are eased.
2. The historical information may be directly stored in the memory matrix, and thus the memory ability of the network to the historical information is greatly enhanced.

However, the current memory neural network has two deficiencies that:
1. An addressing mode, on which memory reading and writing depends, is content-based addressing and location-based addressing. Such addressing mode relatively highly consumes the memory, a space complexity of the addressing mode is in direct proportion to the size of the whole memory matrix, and a speed of the addressing mode is relatively slow due to complex operation.
2. A processing unit for comprehensively computing read memory information and hidden-state information transferred by the last time step only simply reuses a computing step of the LSTM, and thus the memory information cannot be effectively utilized.

Thus, the current memory neural network has the problems in the aspects of speed, memory consumption, memory information utilization efficiency and the like.

SUMMARY OF THE INVENTION

In order to overcome the deficiencies of a memory neural network for enhancing the ability of a RNN and further improve the compression performance of the memory neural network under the condition of considering the computing complexity, the present invention provides a memory network method based on automatic addressing and recursive information integration.

The memory network method based on automatic addressing and recursive information integration comprises the steps of:
1) using automatic addressing to conduct reading operation on the memory matrix, coding historical memory addressing information by directly utilizing a hidden state $h_{t-1}$ transferred between different time steps of the recurrent neural network (RNN), and addressing a memory in combination with current input $x_t$;
2) comprehensively computing the hidden state $h_{t-1}$, memory information $r_t$ and input $x_t$ by using a computing unit integrating recursive information:

$$\begin{Bmatrix} g_t^h \\ g_t^r \end{Bmatrix} = \begin{Bmatrix} \sigma \\ \sigma \end{Bmatrix} W_{ig}[x_t, h_{t-1}, r_t] + b_{ig}, \quad (1)$$

$$h_{t-1}^g = g_t^h \circ h_{t-1}, \quad (2)$$

$$r_t^g = g_t^r \circ r_t, \quad (3)$$

$$\begin{Bmatrix} i_t \\ f_t \\ g_t \\ o_t^h \\ o_t^r \end{Bmatrix} = \begin{Bmatrix} \sigma \\ \sigma \\ \tanh \\ \sigma \\ \sigma \end{Bmatrix} W_{go}[x_t, h_{t-1}^g, r_t^g] + b_{go}, \quad (4)$$

$$h_t = f_t \circ h_{t-1} + i_t \circ g_t, \quad (5)$$

$$o_t = [o_t^h \circ \tanh(h_t), o_t^r \circ \tanh(r_t)]. \quad (6)$$

wherein in formula (1), two gates ($g_t^h$, $g_t^r$) for computing are used for controlling information inflow of $h_{t-1}$ and $r_t$ element by element respectively, that is meanings of formula (2) and formula (3). Thereafter, an information processing mode of a long-short term memory network (LSTM) is reused for comprehensive computing, as shown in formula (4) and formula (5), and finally, newly generated hidden state $h_t$ and memory information $r_t$ use two output gates computed in the formula (4) to conduct information control and connection and then are output;
3) conducting writing operation on the memory:
writing the new hidden state $h_t$ generated at this moment as information needing to be remembered; and 4) entering a next time step:

transferring $h_t$ to the next time step, receiving input $x_{t+1}$, and returning to the step 1) for cyclically executing the above steps.

Preferably, an automatic addressing method specifically comprises the steps of connecting the $h_{t-1}$ with the $x_t$, sending the connected $h_{t-1}$ and $x_t$ into a fully connected layer to obtain one N-dimension embedding, the embedding is considered as a non-normalized memory addressing probability, the probability is sampled into a one-hot vector by using gumbel-softmax, and an item $r_t$ of D dimension at a location, corresponding to an element being 1 in the vector, in the memory is read.

Preferably, a writing location, at which the memory is written in the step 3), is a location using the one-hot vector for reading $r_t$.

Preferably, the automatic addressing method only uses the $h_{t-1}$ and the $x_t$ for memory addressing and uses a gumbel-softmax function to conduct normalization and one-hot sampling on a non-normalized probability vector.

Preferably, compared with 4 gates of the LSTM, for the computing unit integrating the recursive information, 3 gates which are $g_t^h$, $g_t^r$ and $o_t^r$ are newly added to be used for controlling information inflow of the $h_{t-1}$ and the $r_t$ and directly outputting information of the $r_t$ respectively.

The method of the present invention has the following advantages that: the method of the present invention is a memory network method based on automatic addressing and recursive information integration and is an efficient and lightweight memory network method; a memory is read and written by means of an automatic addressing operation having low time and space complexity, and memory information is effectively utilized by a novel computing unit; the whole framework has the characteristics of high efficiency, high speed and high universality; and the method is suitable for various time sequence processing tasks and shows the performance superior to that of the conventional LSTM and the previous memory network.

DETAILED DESCRIPTION OF THE INVENTION

The present invention is further described in the following embodiments in conjunction with the appended figures, which do not limit the scope of the invention in any way. The present invention provides a memory network method based on automatic addressing and recursive information integration. The method is a memory neural network based on automatic addressing and recursive information integration. Memory information is effectively utilized by a novel computing unit. The whole framework has the characteristics of high efficiency, high speed and high universality. The method is suitable for various time sequence processing tasks and shows the performance superior to that of the conventional LSTM and the previous memory network.

Figure 1:
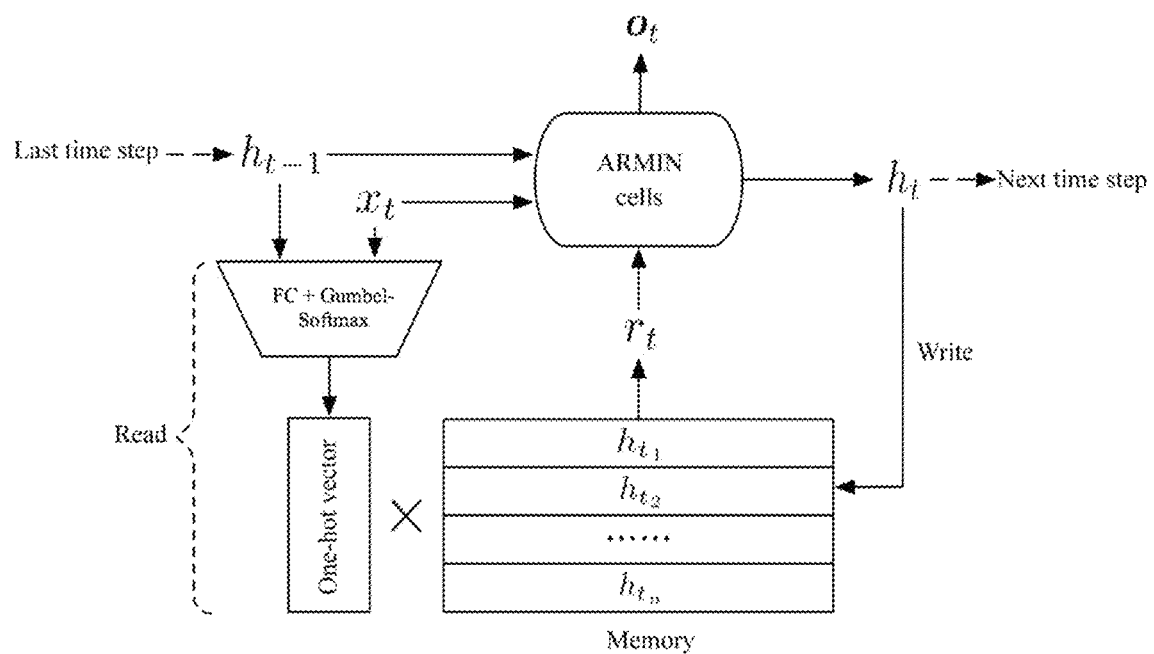
FIG. 1 is a flow block diagram of a memory network method based on automatic addressing and recursive information integration of the present invention.
Figure 2:
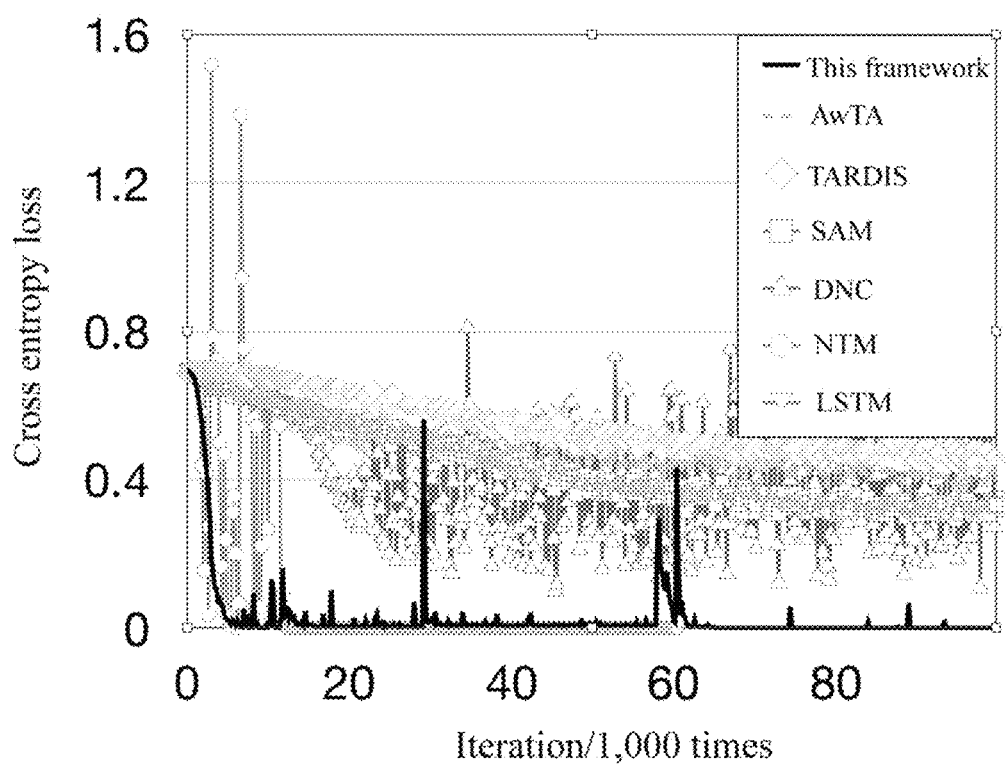
FIG. 2 is a cross entropy loss decline curve of a validation set on a task of copies in an array of the present invention.
Figure 3:
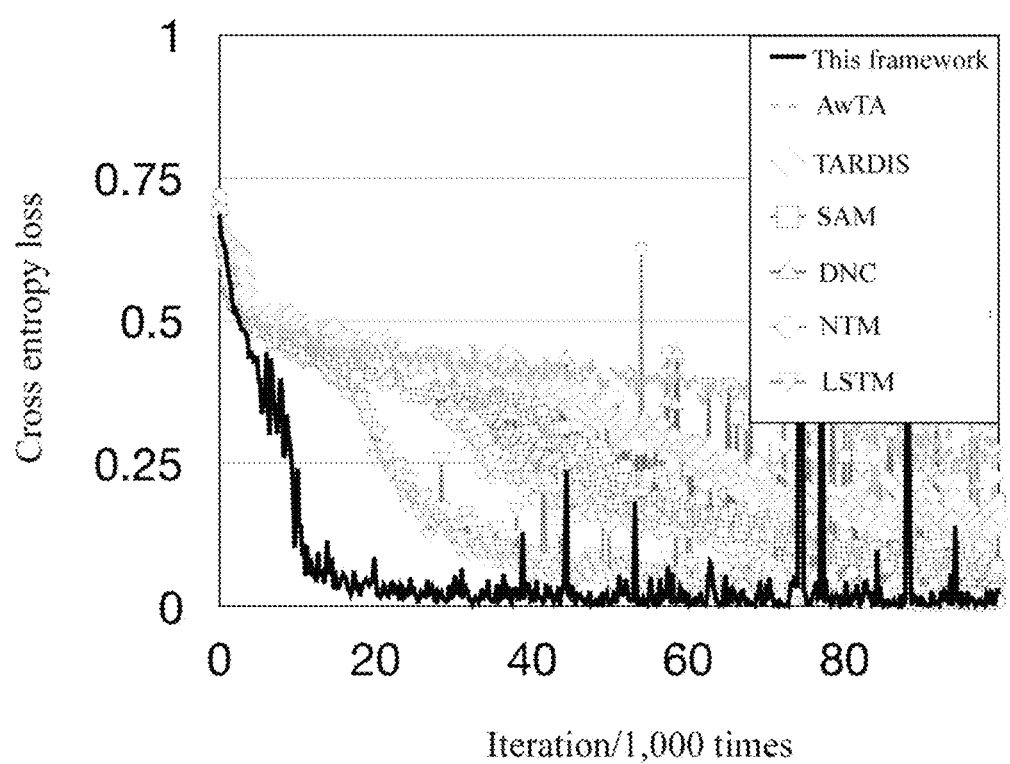
FIG. 3 is a cross entropy loss decline curve of a validation set on a task of repeated copies of the present invention.
Figure 4:
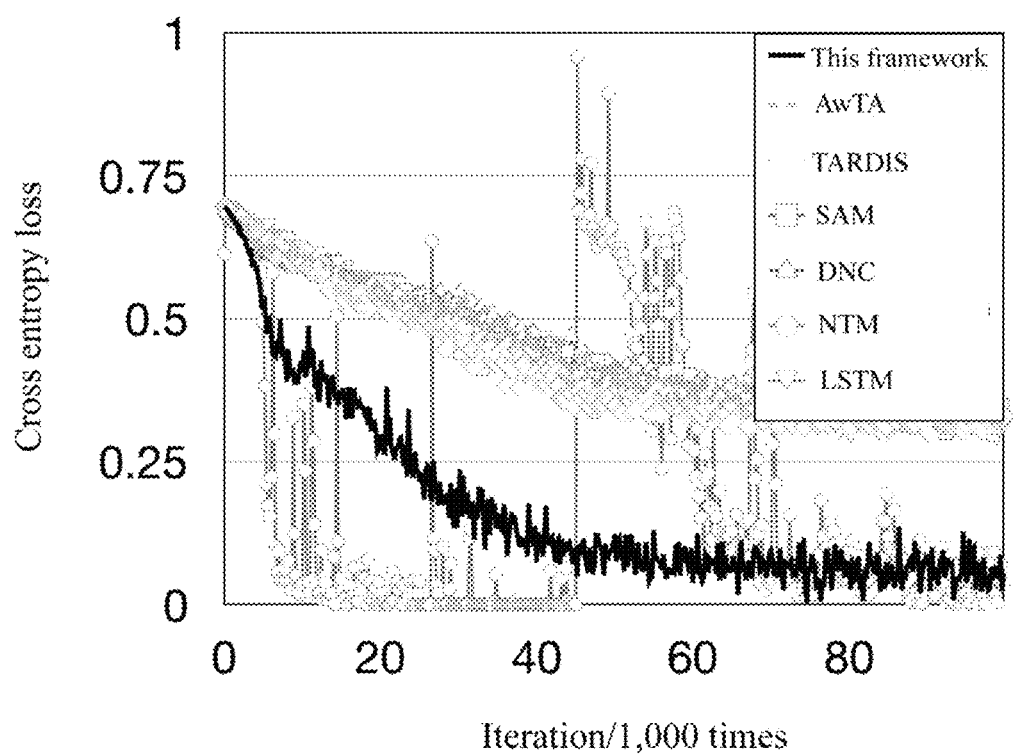
FIG. 4 is a cross entropy loss decline curve of a validation set on a relative recall task of the present invention.
Figure 5:
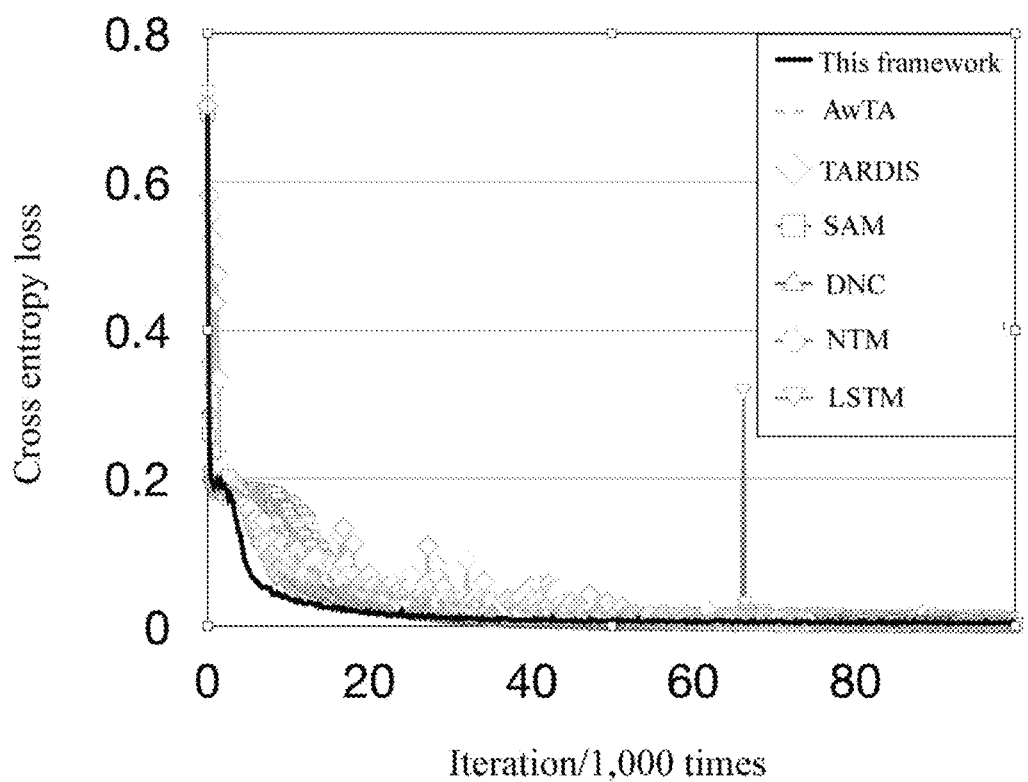
FIG. 5 is a cross entropy loss decline curve of a validation set on a task of priority ranking of the present invention.

The method of the present invention proposes a novel neural network method based on automatic addressing and recursive information integration aiming at a time sequence task, that is a memory recurrent neural network framework. FIG. 1 is a flow block diagram of the memory network method of the present invention. The specific embodiment is as follows.

A memory matrix of the memory recurrent neural network framework is a matrix of N×D dimension, wherein N is an amount of items of the memory, D is equal to a dimension of the hidden state of the RNN. Processing of a standard RNN input sequence comprises the following computing steps of:

1) conducting a reading operation on the memory matrix by using automatic addressing:

an automatic addressing method of the memory recurrent neural network framework is that historical memory addressing information is coded by directly utilizing a hidden state $h_{t-1}$ transferred between different time steps of RNN, and addressing is conducted on the memory by combining with current input $x_t$. Particularly, the $h_{t-1}$ and the $x_t$ are connected together and sent into a fully connected layer (FC) to obtain one N-dimension embedded vector, the embedded vector is considered as a non-normalized memory addressing probability, the probability is sampled into a one-hot vector by using gumbel-softmax function proposed by researchers, and memory information $r_t$ of D dimension at a location, corresponding to an element being 1 in the vector, in the memory is read. As the addressing method is simple to operate and relatively rapid in running speed and has a space complexity of only $O(d_h+d_x)$, a memory network is greatly reduced compared with that before. The step is shown as a part of flows at a block with a Chinese character "Read".

2) Comprehensively computing the hidden state $h_{t-1}$, the memory information $r_t$ and the input $x_t$ by using a computing unit integrating recursive information:

$$\begin{Bmatrix} g_t^h \\ g_t^r \end{Bmatrix} = \begin{Bmatrix} \sigma \\ \sigma \end{Bmatrix} W_{ig}[x_t, h_{t-1}, r_t] + b_{ig}, \quad (1)$$

$$h_{t-1}^g = g_t^h \circ h_{t-1}, \quad (2)$$

$$r_t^g = g_t^r \circ r_t, \quad (3)$$

$$\begin{Bmatrix} i_t \\ f_t \\ g_t \\ o_t^h \\ o_t^r \end{Bmatrix} = \begin{Bmatrix} \sigma \\ \sigma \\ \tanh \\ \sigma \\ \sigma \end{Bmatrix} W_{go}[x_t, h_{t-1}^g, r_t^g] + b_{go}, \quad (4)$$

$$h_t = f_t \circ h_{t-1} + i_t \circ g_t, \quad (5)$$

$$o_t = [o_t^h \circ \tanh(h_t), o_t^r \circ \tanh(r_t)]. \quad (6)$$

wherein in formula (1), two gates ($g_t^h$, $g_t^r$) for computing are used for controlling information inflow of $h_{t-1}$ and $r_t$ element by element respectively, that is meanings of formula (2) and formula (3). Thereafter, an information processing mode of a LSTM is reused for comprehensive computing, as shown in formula (4) and formula (5), and finally, newly generated hidden state $h_t$ and memory information $r_t$ use two output gates computed in the formula (4) to conduct information control and connection and then are output. Compared with direct reuse of the LSTM, the computing unit filters information undesired by this time step in the input $h_{t-1}$ and $r_t$ firstly and more uses one output gate to control information for output in $r_t$ finally. Therefore, the fault tolerance and the flexibility to reading of memory information may be greatly improved.

Compared with 4 gates of the LSTM, for the computing unit integrating the recursive information, 3 gates which are $g_t^h$, $g_t^r$ and $o_t^r$ are newly added to be used for controlling information inflow of the $h_{t-1}$ and the $r_t$ and directly outputting information of the $r_t$ respectively. The step is a computing process occurring in a block diagram located by characters of "ARMIN (Auto-addressing and Recurrent Memory Integration Network) cells" in FIG. 1.

3) Conducting writing operation on the memory: writing the new hidden state $h_t$ generated at this moment as information needing to be remembered, wherein a writing location is a location at which the $r_t$ is read by using a one-hot vector in the step 1). The step is shown as a part of flows at a block with a Chinese character "Write".

4) Entering a next time step: Transferring the $h_t$ to the next time step, receiving input $x_{t+1}$, and returning to the step 1) for cyclically executing the above steps. As shown by "last time step", "next time step" and arrows in FIG. 1, the circular processing process of the network is displayed. The effect of the framework provided by a point cloud attribute compression method of the present invention is described in combination with a set of algorithm tasks below. Particularly, the set of algorithm tasks are divided into: a) copies in an array: 50 6-bit binary digits randomly generated at previous 50 time steps are input into the recursive network, the network is required to output the previously input target array at late 50 time steps according to a sequence the same as that of output. In all following experiments, a deviation degree between an actual output array and the target array is measured by using a cross entropy loss, and the lower the deviation degree is, the lower the cross entropy loss is, which shows that the ability of the recursive network utilizing historical memory information to finish tasks is stronger, wherein a cross entropy loss decline curve is shown as FIG. 2. b) repeated copies: an array of 1-10 in length is input into the recursive network and is copied and output for 1-10 times, wherein a cross entropy loss decline curve is shown as FIG. 3. c) relative recall: 2-6 (key, value) pairs are input into the recursive network, then one key is input, and the corresponding value to the key is required for outputting, wherein a cross entropy loss decline curve is shown as FIG. 4. d) priority ranking: 40 (key, value) pairs are input into the recursive network randomly, highest values of previous 30 keys are output in a descending manner according to priority of keys, wherein a cross entropy loss decline curve is shown as FIG. 5. By using a cross entropy loss between an output binary sequence and a standard answer as a task loss to evaluate the performance of a model, and the lower the loss is, the better the performance of the network is. The memory recurrent neural network framework is compared with the previous memory networks, that is the frameworks, such as a TARDIS (Temporal Automatic Relation Discovery in Sequences), an AwTA (ARMIN with TARDIS Addressing), an SAM (Sparse Access Memory), a DNC (Differentiable Neural Computer) and an NTM (Neural Turing Machine) as shown in FIGS. 2-FIG. 5.

From FIGS. 2-FIG. 5, the framework shows the characteristics of relatively rapid loss decline on all the 4 tasks and finally relatively small convergence loss. The less the required amount of iterations is, the higher the utilization ratio of a training sample is. Shown that the described memory addressing mechanism of the framework hereinbefore has the advantages of relatively rapid learning and high utilization ratio of memory information. Further, an actual running speed of the framework is 3-4 times of that of the NTM with relatively good performance in the frameworks.

It should be noted that an objective of the embodiment of the present invention is to help further understanding of the present invention. However, those skilled in the art will appreciate that various substitutions and modifications are possible without departing from the spirit and scope of the present invention and the appended claims. Therefore, the present invention should not be limited to contents disclosed in the embodiments, and the protection scope of the present invention is subject to the scope in claims.

INDUSTRIAL APPLICABILITY

The present invention is suitable for the field of deep learning and particularly suitable for a recurrent neural network and a memory neural network. For a memory network method based on automatic addressing and recursive information integration of the present invention, a memory is read and written by means of an automatic addressing operation having low time and space complexity, and memory information is effectively utilized by a novel computing unit. The whole framework has the characteristics of high efficiency, high speed and high universality. The method is suitable for various time sequence processing tasks and shows the performance superior to that of the conventional LSTM and the previous memory network.

The invention claimed is:

1. A memory network method based on automatic addressing and recursive information integration, the method comprising performing, by a computer processor, operations of:
  1) Using automatic addressing to conduct reading operation on a memory matrix, coding historical memory addressing information by directly utilizing a hidden state $h_{t-1}$ transferred between different time steps of a recurrent neural network (RNN) and addressing a memory in combination with current input $x_t$,
  2) Comprehensively computing the hidden state $h_{t-1}$, memory information rt and input $x_t$ by integrating recursive information:

$$\begin{Bmatrix} g_t^h \\ g_t^r \end{Bmatrix} = \begin{Bmatrix} \sigma \\ \sigma \end{Bmatrix} W_{ig}[x_t, h_{t-1}, r_t] + b_{ig}, \quad (1)$$

$$h_{t-1}^g = g_t^h \circ h_{t-1}, \quad (2)$$

$$r_t^g = g_t^r \circ r_t, \quad (3)$$

$$\begin{Bmatrix} i_t \\ f_t \\ g_t \\ o_t^h \\ o_t^r \end{Bmatrix} = \begin{Bmatrix} \sigma \\ \sigma \\ \tanh \\ \sigma \\ \sigma \end{Bmatrix} W_{go}[x_t, h_{t-1}^g, r_t^g] + b_{go}, \quad (4)$$

$$h_t = f_t \circ h_{t-1} + i_t \circ g_t, \quad (5)$$

$$o_t = [o_t^h \circ \tanh(h_t), o_t^r \circ \tanh(r_t)]. \quad (6)$$

wherein in formula (1), two gates ($g_t^h$, $g_t^r$) for computing are used for controlling information inflow of $h_{t-1}$ and $r_t$ element by element respectively, that is meanings of formula (2) and formula (3); thereafter, an information processing mode of a long-short term memory network (LSTM) is reused for comprehensive computing, as shown in formula (4) and formula (5), and finally, newly generated hidden state $h_t$ and memory information $r_t$ use two output gates computed in the formula (4) to conduct information control and connection and then are output;

3) Conducting writing operation on the memory:
writing the new hidden state $h_t$ generated at this moment as information needing to be remembered; and 4) Entering a next time step:
transferring $h_t$ to the next time step, receiving input xt+1, and returning to the operation 1) for cyclically executing the above operation.

2. The memory network method according to claim 1, wherein the ht−1 and the $x_t$ are connected together and sent into a fully connected layer FC to obtain one N-dimension embedded vector, the embedded vector is considered as a non-normalized memory addressing probability, the probability is sampled into a one-hot vector by using a gumbel-softmax function, and memory information $r_t$ of D dimension at a location, corresponding to an element being 1 in the vector, in the memory is read.

3. The memory network method according to claim 2, wherein a writing location, at which the memory is written in the operation 3), is a location using the one-hot vector for reading $r_t$.

4. The memory network method according to claim 1, wherein the automatic addressing method only uses the $h_{t-1}$ and the $x_t$ for memory addressing and uses the gumbel-softmax function to conduct normalization and one-hot sampling on a non-normalized probability vector.

5. The memory network method according to claim 1, wherein compared with 4 gates of the long-short term memory network (LSTM), for the computing unit integrating the recursive information, 3 gates which are $g_t^h$, $g_t^r$ and $o_t^r$ are newly added to be used for controlling information inflow of the $h_{t-1}$ and the $r_t$ and directly outputting information of the $r_t$ respectively.

* * * * *